United States Patent [19]

Schiff

[11] 4,278,273
[45] Jul. 14, 1981

[54] PERSONAL SAFETY RESTRAINT ASSEMBLY FOR VEHICLE OCCUPANTS

[76] Inventor: Robert D. Schiff, 3370 Wrightwood Dr., Studio City, Calif. 91604

[21] Appl. No.: 72,150

[22] Filed: Sep. 4, 1979

[51] Int. Cl.³ .............................................. B60R 21/10
[52] U.S. Cl. ..................................... 280/802; 280/749
[58] Field of Search ............................. 280/801–808, 280/749, 748; 297/468–481

[56] References Cited

U.S. PATENT DOCUMENTS

| | | | |
|---|---|---|---|
| 1,895,222 | 1/1933 | Johnson | 297/468 |
| 2,740,642 | 4/1956 | Atwood | 280/749 X |
| 3,169,781 | 2/1965 | Abruzzino | 280/749 |
| 3,341,250 | 9/1967 | Rasmussen | 297/478 X |
| 3,440,602 | 4/1969 | Frig | 280/801 X |
| 3,583,727 | 6/1971 | Lindblad | 280/804 |
| 3,727,944 | 4/1973 | Wize | 280/803 |
| 3,765,701 | 10/1973 | Bowler et al. | 280/803 |
| 3,850,446 | 11/1974 | Hogensen | 280/803 |
| 3,857,581 | 12/1974 | Kaneko et al. | 280/803 |
| 3,865,397 | 2/1974 | Pilhall et al. | 280/803 |
| 3,897,963 | 8/1975 | Seiffert et al. | 280/803 |
| 3,971,569 | 7/1976 | Abe et al. | 280/804 X |
| 4,053,175 | 10/1977 | Kato et al. | 280/803 |
| 4,124,224 | 11/1978 | Matsuoka | 280/801 |

FOREIGN PATENT DOCUMENTS 2530977  1/1977  Fed. Rep. of Germany ........... 297/468

*Primary Examiner*—Joseph F. Peters, Jr.
*Assistant Examiner*—Randall A. Schrecengost
*Attorney, Agent, or Firm*—Robert L. Finkel

[57] ABSTRACT

A personal safety restraint assembly for vehicle occupants employs a broad band of flexible webbing or sheet material to distribute the restraining forces over a large area of the occupant's rib cage and pelvic region. One end of the band is secured to a floor mounted support, located at the rear innermost side of the seat. The other end is slidably attached to a guide mounted to the adjacent vehicle door by means of a convenient manually positionable locking mechanism, whereby the tension applied to the restraining band can be varied at will.

6 Claims, 8 Drawing Figures

PERSONAL SAFETY RESTRAINT ASSEMBLY FOR VEHICLE OCCUPANTS

BACKGROUND OF THE INVENTION

1. Field of the Invention

The subject invention relates generally to passive restraining devices for vehicle occupants, and more particularly to safety seat belts and harnesses having manually operable positioning, tensioning and releasing means.

2. Prior Art

The passive restraints in common use today generally employ a relatively narrow seat belt positioned across the wearer's lap. In some installations additional restraint is provided by means of chest straps and shoulder harnesses. These often become twisted or tend to slip to the floor or into crevices in the upholstery. Many of them are designed in such a way that they become binding and give the wearer the feeling of being trapped and unable to escape. Many members of the motoring public find such equipment annoying and uncomfortable, and therefore elect not to use it. Additionally, even when they are worn, the narrow belts and straps of some prior art restraints have been known to cause serious injury by concentrating the restraining force on critical parts of the wearer's body.

Various devices incorporating specialized straps, buckles, retractors, winding spools, inertial reels, and the like have been developed in an effort to overcome or at least minimize these and other problems associated with prior art restraints. Some of these are designed to operate in conjunction with the opening and closing of the vehicle door. Typical examples of such devices are illustrated in U.S. Pat. Nos. 3,583,726, 3,727,944, 3,765,701, 3,850,446, 3,857,581, 3,865,397, 3,897,963, 4,053,175 and 4,124,224. While the use of the opening and closing of the vehicle door to position a seat belt or chest strap has certain advantages, the means used to accomplish this purpose suffer from a variety of deficiencies. The most serious of these are their potential for hazardous mechanical failure and their propensity to malfunction and leave the vehicle occupant either wholly uprotected with a slack seat belt or chest strap, or immobilized by an overly-tight belt or strap that cannot be released. These problems are generally attributable to the complexity of the structures required to make prior art safety restraints function "automatically." By and large such restraints have proved to be unsatisfactory, and there still remains an urgent need for a personal safety restraint assembly for vehicle occupants which is convenient, comfortable, reliable and acceptable to the motoring public. The object of the present invention is to satisfy this need.

SUMMARY OF THE INVENTION

In its preferred form, the invention comprises a broad band of flexible webbing or sheet material secured at one of its ends to a floor mounted support, located at the rear innermost side of the vehicle seat. The other end of the band is provided with a rigid attachment member of unique construction. A sturdy guide or track is attached to the inner face of the adjacent vehicle door, preferably at an angle sloping forwardly upwardly in relation to the vehicle floor, and the attachment member is adapted to mount slidingly to the guide. The guide contains a plurality of detent means, conveniently in the form of notches, spaced along its length. Manually operable spring loaded locking means in the attachment member permit the vehicle occupant to position the attachment point of the free end of the restraining band at any desired location on the guide.

With the attachment member positioned at the forward end of the guide, when the door is swung open the restraining band is carried forwardly to provide adequate clearance for the occupant to enter the vehicle. With the door closed, the occupant has only to actuate the locking mechanism and slide the attachment member rearwardly along the guide in order to achieve precisely the degree of comfort and security he or she desires. When the locking mechanism is released it engages one of the detents in the guide and retains the attachment member in the selected position. To facilitate leaving the vehicle, the occupant actuates the locking mechanism and slides the attachment member forwardly on the guide thereby providing the maximum clearance when the door is opened.

BRIEF DESCRIPTION OF THE DRAWINGS

For a better understanding of the invention, reference may be made to the following description of a preferred embodiment, given in conjunction with the accompanying drawings, in which.

DETAILED DESCRIPTION OF THE INVENTION

Figure 1:
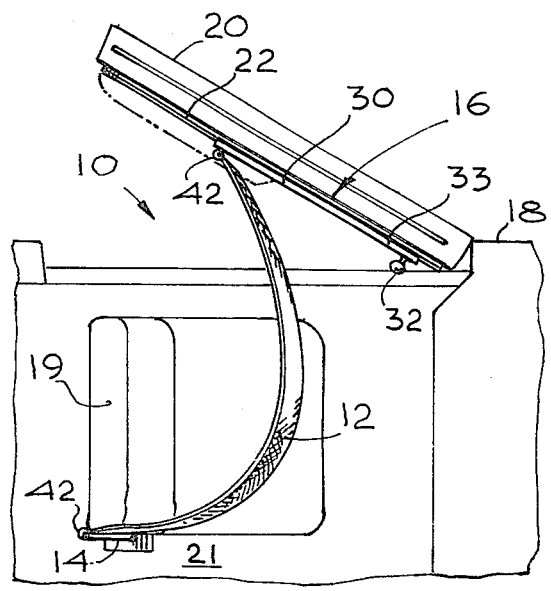
FIG. 1 is a schematic fragmentary partially cut-away plan view showing one seat and the adjacent door of a vehicle incorporating the invention, with the door ajar and the attachment mechanism in its forwardmost position to permit easy entry and exit.
Figure 2:
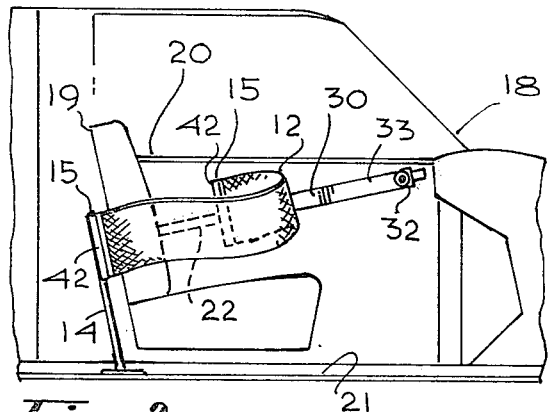
FIG. 2 is a schematic fragmentary partially cut-away elevational view of the embodiment of FIG. 1, with the door closed.

In FIGS. 1 and 2 the safety restraint assembly 10 is illustrated in position to afford relatively unimpeded entry or exit to the occupant. The assembly comprises a restraint 12 in the form of a broad band of high tensile strength flexible, and preferably pliable, webbing or sheet material. A band of Dacron or Dacron and cotton webbing approximately 8 inches wide and 53 inches long is satisfactory for most installations.

Figure 3:
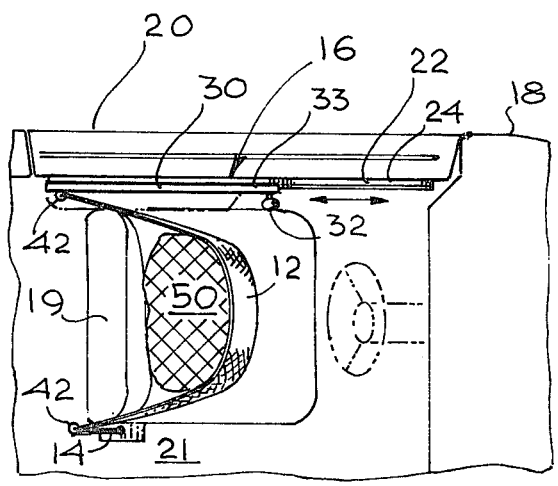
FIG. 3 is a schematic fragmentary partially cut-away plan view of the embodiment of FIG. 1, with the door closed and the restraining band fitted to the driver.
Figure 4:
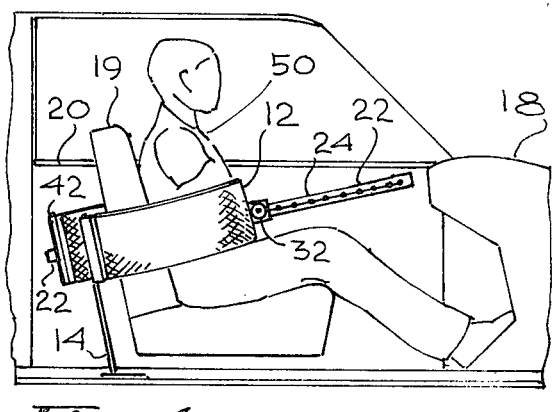
FIG. 4 is a schematic fragmentary partially cut-away elevational view of the embodiment of FIG. 1 as depicted in FIG. 3.

There are several advantages to using a broad restraint in connection with the assembly of the subject invention, rather than the conventional seat or lap belt presently in use. As shown in FIGS. 3 and 4, the construction of my assembly positions the restraint across the occupant's mid-section and lower rib cage, thereby affording greater resistance to the forces tending to throw the upper torso and head forwardly in the event of a collision. The greater width of the band 12 distributes the restraining force over a greater area, thereby minimizing the chances of skeletal or soft tissue injury to the occupant. Additionally, I find that the positioning of the broad band and its pliability make it more comfortable to wear than the customary lap or seat belt.

Figure 5:
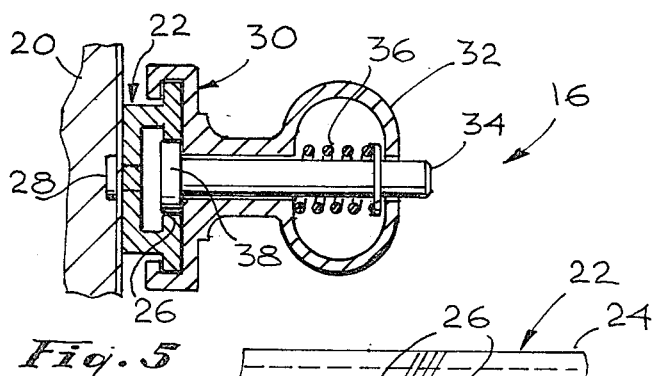
FIG. 5 is an enlarged fragmentary cross sectional view of the guide, detents, attachment means and locking mechanism of the embodiment of FIG. 1.
Figures 7, 8:
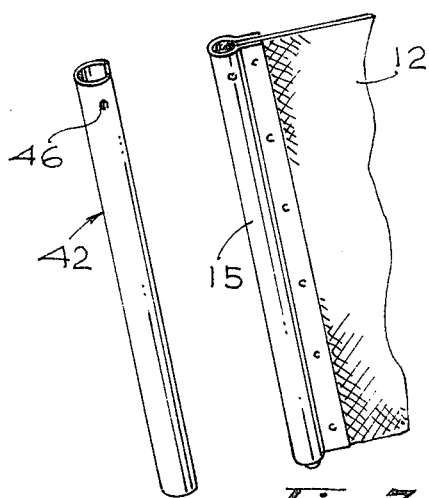
FIG. 7 is an enlarged pictorial view of a typical end piece for the restraining band of the embodiment of FIG. 1.
FIG. 8 is a pictorial view of a typical receiver for the end piece of FIG. 7.

In the preferred embodiment the ends of restraint 12 are provided with end pieces in the form of metal clips 15 adapted to be securely inserted in corresponding receivers 42. The construction of clips 15 and receivers 42 is best seen in FIGS. 7 and 8. One of the receivers 42 is secured to an attachment member 30 shown in FIG. 5, and the other is secured to a floor mounted support post 14.

Figure 6:
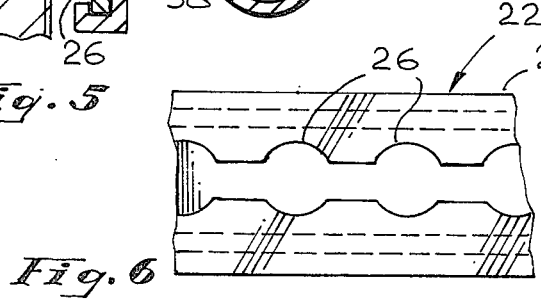
FIG. 6 is a partial elevational view of the guide and detents of FIG. 5.

Manually adjustable attachment means 16 include an elongated guide or track 22 bolted, welded or otherwise firmly secured to the crash-resistant internal structure of the door 20, and attachment member 30. As shown in FIG. 6, the guide 22 is provided with a plurality of notches 26 spaced along its length. Attachment member 30 is secured to guide 22 for sliding motion longitudinally thereof, and includes a handle lock 32 at its forward end 33 containing a handle lock pin 34 which is urged in the direction of guide 22 by spring 36 or other resilient means which force the round locking member 38 to engage notches 26 in guide 22.

With the handle lock 32 positioned at the forwardmost end of guide 22, when door 20 is opened the attached end of restraint 12 is carried forwardly to permit the occupant to enter and exit the vehicle with ease. Once seated with the door closed the occupant 50 can adjust the tension and position of restraint 12 to his particular satisfaction by depressing handle lock pin 34, moving handle lock 32 rearwardly, and releasing pin 34 to engage locking member 38 in the nearest notch 26 in guide 22. If the occupant wishes to readjust the location or tension of restraint 12, he or she can do so at will by simply moving handle lock 32 forwardly or rearwardly in a similar manner. To exit the vehicle he or she need only move handle lock 32 to its forwardmost position, where it will remain until the restraint is used again.

Although I have shown and described my invention as it may be installed at the driver's position, it will be understood that the same arrangement can be applied to all of the other occupant locations in the vehicle as well. Likewise it will be understood that while the particular structures and materials shown and described are preferred, they are intended as illustrative only, and not as limitations on the breadth of the invention as it is defined in the following claims.

What I claim is:

1. A personal safety restraint assembly for occupants seated in a vehicle, comprising in association with a seat in the vehicle:
    a broad band of flexible material adapted to cover a portion of the occupant's pelvic region and rib cage;
    first attachment means mounted to the floor of the vehicle at the rear of the innermost side of the seat and extending above the level of the seat, one end of said band being secured to said attachment means at an elevation above the floor substantially level with the occupant's mid-section;
    a guide fixed to the vehicle door adjacent the seat at an elevation above the floor substantially level with the occupant's mid-section;
    second attachment means slidably mounting the other end of said band to said guide;
    manually operable positioning means associated with said second attachment means for selectively positioning said second attachment means on said guide and in cooperation with said first attachment means thereby positioning said band transversely across the occupant's pelvic region and lower rib cage; and
    locking means associated with said positioning means for releasably locking said second attachment means to said guide in selected positions thereon.

2. A personal safety restraint assembly in accordance with claim 1 wherein said guide is inclined downwardly rearwardly with respect to the vehicle floor.

3. A personal safety restraint assembly in accordance with claim 2 wherein said first attachment means comprises a floor mounted support post.

4. A personal safety restraint assembly in accordance with claim 3 wherein said second attachment means includes an elongated attachment member slidably mounted to said guide, said other end of said band is secured to the rear end of said attachment member, and said positioning means includes a handle located on the forward end of said attachment member.

5. A personal safety restraint assembly in accordance with claim 4 wherein said guide is provided with detent means and said locking means includes detent engaging means, resilient means urging said detent engaging means into engagement with said detent means, and manually operable release means for disengaging said detent engaging means and said detent means.

6. A personal safety restraint assembly in accordance with claim 5 wherein said detent means include a plurality of notches spaced along said guide, said detent engaging means is located in said handle and includes a stud adapted for engagement with said notches under the influence of said resilient means, and said release means includes a locking pin formed on said stud and extending outwardly of said handle, whereby said stud may be forced out of engagement with said notches.

* * * * *